US012722334B2

(12) United States Patent
Collins et al.

(10) Patent No.: US 12,722,334 B2
(45) Date of Patent: Sep. 1, 2026

(54) SYSTEMS AND APPROACHES FOR MANUFACTURING PARTS

(71) Applicant: THE PROCTER & GAMBLE COMPANY, Cincinnati, OH (US)

(72) Inventors: Bryler Collins, Maineville, OH (US); Gene Michael Altonen, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 18/838,594

(22) PCT Filed: Jun. 15, 2023

(86) PCT No.: PCT/US2023/025402

§ 371 (c)(1),
(2) Date: Aug. 14, 2024

(87) PCT Pub. No.: WO2023/244723

PCT Pub. Date: Dec. 21, 2023

(65) Prior Publication Data

US 2025/0153408 A1 May 15, 2025

Related U.S. Application Data

(60) Provisional application No. 63/417,913, filed on Oct. 20, 2022, provisional application No. 63/352,518, filed on Jun. 15, 2022.

(51) Int. Cl.

*B29C 45/76* (2006.01)
*B29C 45/50* (2006.01)
(Continued)

(52) U.S. Cl.

CPC .......... *B29C 45/7646* (2013.01); *B29C 45/50* (2013.01); *B29C 45/77* (2013.01);
(Continued)

(58) Field of Classification Search

CPC .......... B29C 2045/2722; B29C 45/766; B29C 45/762; B29C 45/77; B29C 45/50; B29C 45/7646; B29C 45/76
See application file for complete search history.

(56) References Cited

U.S. PATENT DOCUMENTS

2006/0138690 A1 6/2006 Schwaiger et al.
2010/0252944 A1 10/2010 Bader
(Continued)

FOREIGN PATENT DOCUMENTS

DE 197 09 609 A1 9/1998
WO WO-2017/096107 A1 6/2017

OTHER PUBLICATIONS

International Search Report and Written Opinion for International Application No. PCT/US2023/025402, dated Oct. 27, 2023.

*Primary Examiner* — Stella K Yi
(74) *Attorney, Agent, or Firm* — George H. Leal

(57) ABSTRACT

Systems and approaches for controlling a molding machine having a mold forming a mold cavity, a nozzle, and a screw that moves from a first position to a second position toward the nozzle and being controlled according to a mold cycle. Injecting a molten polymer into the mold cavity and obtaining a first measurement of a variable during the injection cycle using a first sensor positioned at or near the screw. A second sensor positioned at or near the nozzle is used to obtain a second measurement of the variable during the injection cycle. A measured compressibility ratio value is determined in the form of a difference between the measured variable obtained by the first sensor and the measured variable obtained by the second sensor. The measured compressibility ratio value is compared with a reference compressibility ratio value and at least one control parameter is adjusted based on a difference between the reference com-
(Continued)

pressibility ratio value and the measured compressibility ratio value.

20 Claims, 4 Drawing Sheets

(51) Int. Cl.
*B29C 45/77* (2006.01)
*B29K 105/00* (2006.01)

(52) U.S. Cl.
CPC ............... *B29C 2945/76053* (2013.01); *B29C 2945/76187* (2013.01); *B29C 2945/7621* (2013.01); *B29C 2945/76381* (2013.01); *B29C 2945/76478* (2013.01); *B29C 2945/76498* (2013.01); *B29C 2945/76665* (2013.01); *B29C 2945/76829* (2013.01); *B29C 2945/76939* (2013.01); *B29K 2105/0094* (2013.01); *B29K 2995/0063* (2013.01); *B29K 2995/0078* (2013.01)

(56) References Cited

U.S. PATENT DOCUMENTS

2020/0086542 A1 3/2020 Collins et al.
2020/0406521 A1 * 12/2020 Altonen ............. B29C 45/1642

* cited by examiner

SYSTEMS AND APPROACHES FOR MANUFACTURING PARTS

CROSS REFERENCE TO RELATED APPLICATIONS

This present application is the US national phase of International Patent Application No. PCT/US2023/025402 filed on Jun. 15, 2023, which application claims the benefit of U.S. Provisional Application No. 63/352,518, filed on Jun. 15, 2022, and 63/417,913, filed on Oct. 20, 2022, the entirety of each of which is herein expressly incorporated by reference.

FIELD OF THE DISCLOSURE

The present disclosure relates generally to molding and, more particularly, to approaches for controlling injection and/or extrusion molding machines using sensor-based measurements.

BACKGROUND

Molding, and specifically injection and extrusion molding, is a technology commonly used for high-volume manufacturing of parts constructed of thermoplastic materials. During repetitive injection molding processes as well as continuous extrusion molding processes, a thermoplastic resin, typically in the form of small pellets or beads, is introduced into an injection molding machine which melts the pellets under heat and pressure. In an injection cycle, the molten material is forcefully injected into a mold cavity having a particular desired cavity shape. The injected plastic is held under pressure in the mold cavity and is subsequently cooled and removed as a solidified part having a shape closely resembling the cavity shape of the mold. A single mold may have any number of individual cavities which can be connected to a flow channel by a gate that directs the flow of the molten resin into the cavity. A typical injection molding procedure generally includes four basic operations: (1) heating the plastic in the injection molding machine to allow the plastic to flow under pressure; (2) injecting the melted plastic into a mold cavity or cavities defined between two mold halves that have been closed; (3) allowing the plastic to cool and harden in the cavity or cavities while under pressure; and (4) opening the mold halves and ejecting the part from the mold. Upon ejecting the part from the mold, the device that injects the melted plastic into the mold cavity or cavities (e.g., a screw or an auger) enters a recovery phase in which it returns to an original position. In an extrusion process, the molten material is continuously and forcefully extruded through a die having a particular desired shape. The extruded plastic is subsequently cooled and removed as a solidified part having a shape closely resembling the shape of the die orifice. The molded part is provided in an elongated shape, tube, or other form, and is subsequently cut to a desired length. A typical extrusion molding process generally includes three basic operations: (1) heating the plastic in the extrusion molding machine to allow the plastic to flow under pressure; (2) extruding the melted plastic through a die or dies; and (3) allowing the plastic to cool and harden. Each of these operations typically occur at or near the same time.

In these systems, a control system controls the molding process according to an injection cycle that defines a series of control values for the various components of the molding machine. For example, the injection cycle or other molding operations can be driven by a fixed and/or a variable melt pressure and/or screw velocity profile (or screw rotation velocity profile) wherein the controller uses (for example) sensed pressures at a specified location (e.g., the nozzle) and/or properties of the material or extrudate such as, for example, screw velocity as the input for determining a driving force applied to the material.

Increasing environmental awareness has resulted in an increased use of sustainable manufacturing process. For example, post-consumer regrind or recycled plastic materials are increasingly used as a material for forming molded parts. At times, this material may be sourced from different product lots which may not be properly sorted, and as such, subsequent batches of plastic may have different material properties. Additionally, even if the products are properly sorted prior to being reused in manufacturing, it is likely that each individual container within a particular lot may have different viscosity and/or density properties. As a result, the molten polymeric material obtained from the reused containers that is used to form parts may not have uniform material properties such as viscosity and/or density.

Further still, it is possible that when molding with regrind material, the material properties such as viscosity and/or density may vary during a single injection cycle and/or extrusion run. While existing systems may be capable of determining and addressing variations in viscosity of the molten polymeric material, such systems oftentimes cannot account for distinctions between viscosity and density changes to the material, and may apply the same adjustments to the operation of the molding process if either one of a change in viscosity or density is sensed. As a result, these molding machines may produce lower quality parts, which must be removed during quality-control inspections, thereby leading to operational inefficiencies. Moreover, as a molding run may include hundreds, if not thousands, of pounds of materials, the characteristics of the molten plastic material are not constant across each run. Thus, even if the mold cycle is adapted to account for changes in material properties at the onset of the run, the changing properties may still result in the production of lower quality parts and/or parts having varying characteristics later in the run.

SUMMARY

Embodiments within the scope of the present invention are directed to the control of molding machines to produce repeatably consistent parts. Systems and approaches for controlling a molding machine having a mold forming a mold cavity, a nozzle, and a screw that moves from a first position to a second position toward the nozzle and being controlled according to a mold cycle are provided. The approach includes injecting a molten polymer into the mold cavity and obtaining a first measurement of a variable during the injection cycle using a first sensor positioned at or near the screw. A second sensor positioned at or near the nozzle is used to obtain a second measurement of the variable during the injection cycle. A measured compressibility ratio value is determined in the form of a difference between the measured variable obtained by the first sensor and the measured variable obtained by the second sensor. The measured compressibility ratio value is compared with a reference compressibility ratio value and at least one control parameter is adjusted based on a difference between the reference compressibility ratio value and the measured compressibility ratio value.

In some approaches, the measured variable is in the form of a compressibility of the molten plastic material In some forms, the compressibility of the molten plastic material may be used to determine a density value thereof.

In some of these examples, the first sensor may be positioned behind a proximal end of the screw. The first sensor may be in the form of a force sensor. In some examples, the second sensor may be positioned within a flow channel of the injection unit upstream of the mold cavity.

In some forms, the step of adjusting the at least one control parameter includes adjusting a target injection pressure value. In other forms, the approach may include the steps of measuring a shear rate of the molten plastic material to determine a change in viscosity value of the molten plastic material and adjusting at least one control parameter based on a difference between the measured shear rate and a reference shear rate.

In these and other examples, the reference compressibility ratio value is obtained by measuring the reference compressibility ratio value during a previous injection cycle. The previous injection cycle may be in the form of a validation cycle or a projection cycle.

In accordance with a second aspect, a molding machine includes a molding unit, a controller, a first sensor, and a second sensor. The injection unit includes a mold forming a mold cavity and a screw that moves from a first position to a second position toward a nozzle. The injection unit receives and injects a molten plastic material into the mold cavity via the screw and the nozzle to form a molded part. The controller controls operation of the injection molding machine according to a molding cycle. The first sensor is positioned at or near the screw and is communicatively coupled with the controller and measures a variable during the injection cycle. The second sensor is positioned at or near the nozzle and is communicatively coupled with the controller and measures the variable at a second time during the injection cycle. The controller commences injection of the molten polymer into the mold cavity and determines a measured compressibility ratio value in the form of a difference between the measured variable obtained by the first sensor and the measured variable obtained by the second sensor. The controller further compares the measured compressibility ratio value with a reference compressibility ratio value and adjusts at least one control parameter based on a difference between the reference compressibility ratio value and the measured compressibility ratio value.

In accordance with a third aspect, systems and approaches for controlling a molding machine having a die forming a profile and a screw that is rotatable at a variable rate and being controlled according to configured molding parameters are provided and includes extruding a molten polymer through the die and obtaining a first measurement of a variable using a first sensor positioned at or near the rear of the screw. A second sensor positioned at or near the die is used to obtain a second measurement of the variable. A measured compressibility ratio value is determined in the form of a difference between the measured variable obtained by the first sensor and the measured variable obtained by the second sensor. The measured compressibility ratio value is compared with a reference compressibility ratio value and at least one control parameter is adjusted based on a difference between the reference compressibility ratio value and the measured compressibility ratio value.

In some approaches, the measured variable is in the form of a compressibility of the molten plastic material. In some forms, the compressibility of the molten plastic material may be used to determine a density value thereof.

In some of these examples, the first sensor may be positioned behind a proximal end of the screw. The first sensor may be in the form of a force sensor. In some examples, the second sensor may be positioned within a flow channel of the unit upstream of the die. In other examples, the second sensor may be positioned outside of a flow channel of the molding unit. In some forms, the third sensor is positioned within a flow channel of the molding unit upstream of the die. In yet other examples, the third sensor is positioned outside of a flow channel of the molding unit.

In some forms, the step of adjusting the at least one control parameter includes adjusting a target molding pressure value. In other forms, the approach may include the steps of measuring a shear rate of the molten plastic material to determine a change in viscosity value of the molten plastic material and adjusting at least one control parameter based on a difference between the measured shear rate and a reference shear rate.

In these and other examples, the reference compressibility ratio value is obtained by measuring the reference compressibility ratio value during a previous period of operation. The previous period of operation may be in the form of a validation run or a projection run.

In accordance with a fourth aspect, a molding machine includes a molding unit, a controller, a first sensor, and a second sensor. The molding unit includes a die forming a profile and a screw that is rotatable at a variable rate. The molding unit receives and extrudes a molten plastic material through the profile via the screw to form a molded part. The controller controls operation of the molding machine according to configured parameters. The first sensor is positioned at or near the screw and is communicatively coupled with the controller and measures a variable during the run. The second sensor is positioned at or near the die and is communicatively coupled with the controller and measures the variable at a second time during the run. The controller commences extrusion of the molten polymer through the die and determines a measured compressibility ratio value in the form of a difference between the measured variable obtained by the first sensor and the measured variable obtained by the second sensor. The controller further compares the measured compressibility ratio value with a reference compressibility ratio value and adjusts at least one control parameter based on a difference between the reference compressibility ratio value and the measured compressibility ratio value.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale. For example, the dimensions and/or relative positioning of some of the elements in the figures may be exaggerated relative to other elements to help to improve understanding of various embodiments of the present invention.

DETAILED DESCRIPTION

Generally speaking, aspects of the present disclosure include systems and approaches for controlling a molding machine (e.g., an injection molding machine and/or an extrusion molding machine) where a number of sensors are positioned inline and upstream from the mold cavity or orifice to sense changes to the compressibility of the molten polymer. The sensors are arranged to calculate a relative change in compressibility of the molten polymer during the injection process, and to compare any relative changes with a reference value to determine whether corrective adjustments should be made to produce stable and consistent parts. This information may be used to make real-time adjustments of melt pressure setpoints and/or driving forces on the molten polymer.

The systems and approaches described herein use a molding machine (e.g., an injection molding or other molding machine) that may operate at a substantially constant melt pressure value as compared with conventional systems which include a steep ramp-up of melt pressure until a peak pressure value is obtained, followed by a decline in pressure until the injection cycle is completed. Such operation at substantially constant pressure values advantageously eliminates a need to dynamically perform calculations based on sensor measurements due to changing pressure values.

In some examples (and as will be described herein), the molding machine may incorporate a single sensor, two sensors, or more than two sensors used to calculate changes in density in real-time.

Figure 1:
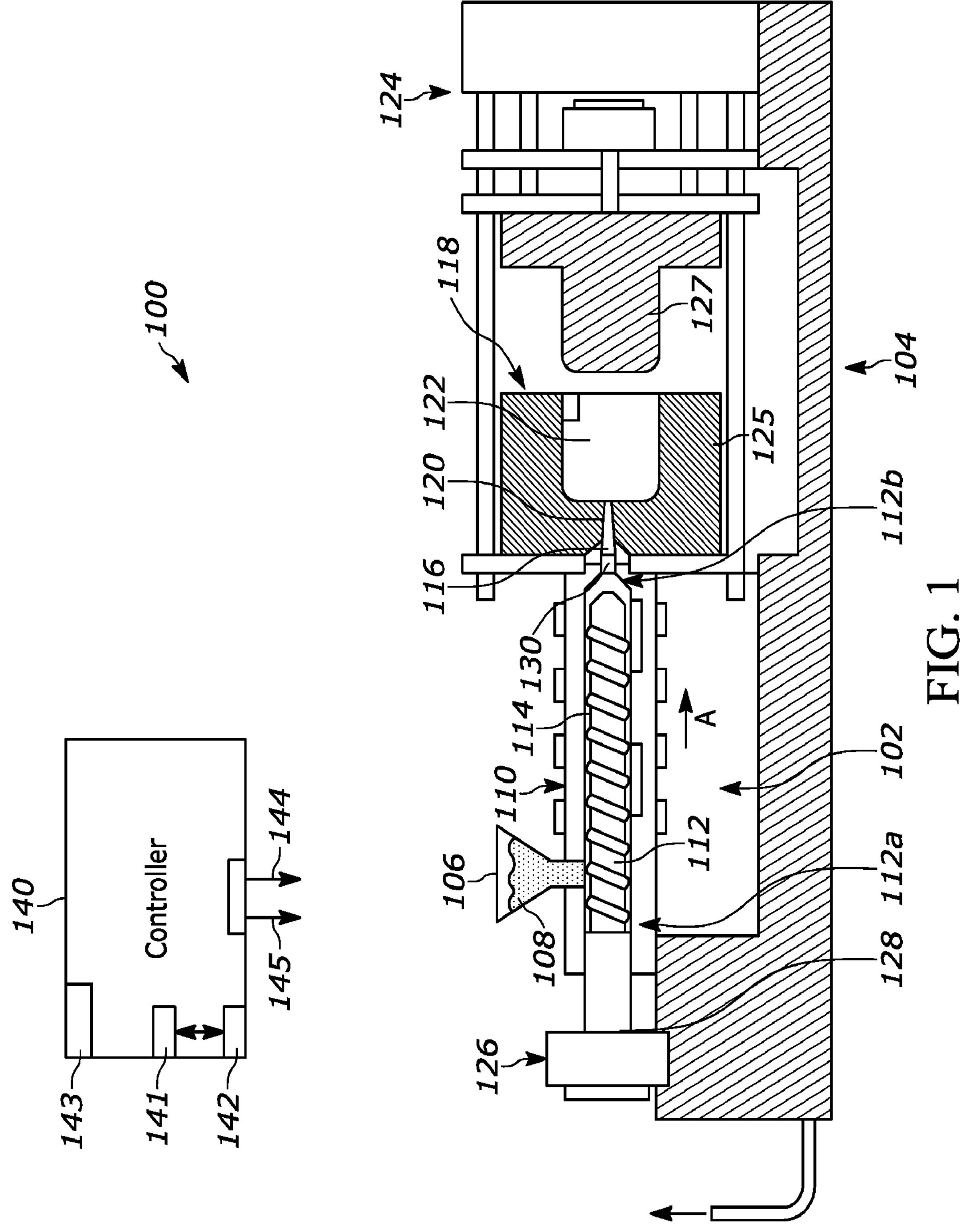
FIG. 1 illustrates a schematic view of an example injection molding machine having a controller coupled therewith in accordance with various embodiments of the present disclosure.
Figure 2:
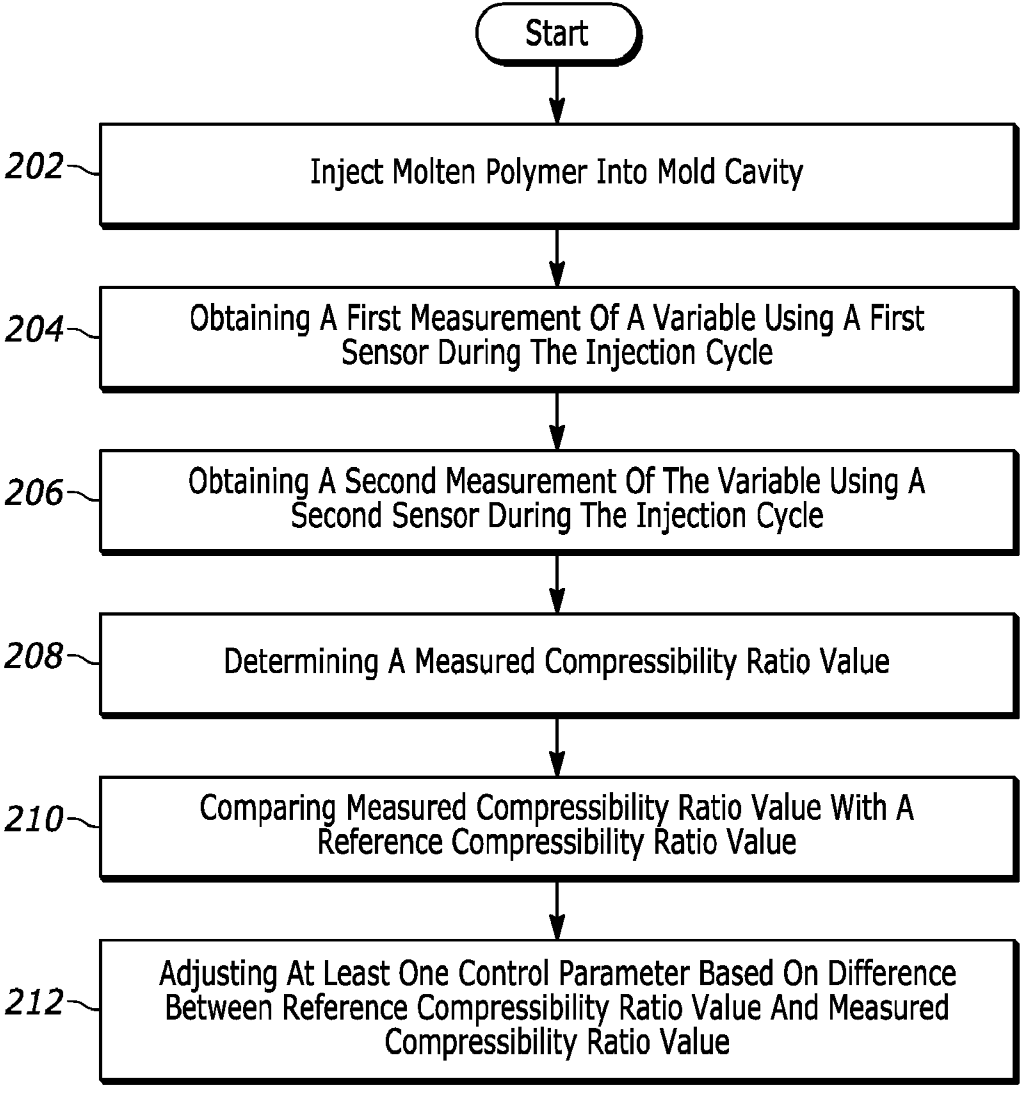
FIG. 2 illustrates an example flow diagram of an example injection cycle having density based control approaches in accordance with various embodiments of the present disclosure.

Turning to the drawings, various molding processes are described. The approaches described herein may be suitable for electric presses, servo-hydraulic presses, hydraulic presses, and other known machines. With reference to FIGS. 1 & 2, an injection molding process is described, and with reference to FIGS. 3 & 4, an extrusion molding process is described. As illustrated in FIG. 1, the injection molding machine 100 includes an injection unit 102 and a clamping system 104. The injection unit 102 includes a hopper 106 adapted to accept material in the form of pellets 108 or any other suitable form. In many of these examples, the pellets 108 may be a polymer or polymer-based material such as, for example, post-consumer regrind (PCR). Other examples are possible.

The hopper 106 feeds the pellets 108 into a heated barrel 110 of the injection unit 102. Upon being fed into the heated barrel 110, the pellets 108 may be driven to the end of the heated barrel 110 towards a barrel end cap **110*a* by a reciprocating screw 112 that is movable from a first, original position 112*a* to a number of subsequent positions for inject the first, second, third, and/or any subsequent shots. The heating of the heated barrel 110 and the compression of the pellets 108 by the reciprocating screw 112 causes the pellets 108 to melt, thereby forming a molten plastic material or polymer 114. The molten plastic material 114** is typically processed at a temperature selected within a range of about 130° C. to about 410° C. (with manufacturers of particular polymers typically providing injection molders with recommended temperature ranges for given materials).

The reciprocating screw 112 includes a proximal end 113 and advances forward from a first position **112*a* to a second position 112*b* and forces the molten plastic material 114 toward a nozzle 116 to form a shot of plastic material that will ultimately be injected into a mold cavity 122 of a mold 118 via one or more gates 120 which direct the flow of the molten plastic material 114 to the mold cavity 122. In other words, the reciprocating screw 112 is driven to exert a force on the molten plastic material 114. In other embodiments, the nozzle 116 may be separated from one or more gates 120 by a feed system (not illustrated). The mold cavity 122 is formed between the first and second mold sides 125, 127 of the mold 118 and the first and second mold sides 125, 127 are held together under pressure via a press or clamping unit 124**.

The press or clamping unit 124 applies a predetermined clamping force during the molding process which is greater than the force exerted by the injection pressure acting to separate the two mold halves 125, 127, thereby holding together the first and second mold sides 125, 127 while the molten plastic material 114 is injected into the mold cavity 122. To support these clamping forces, the clamping system 104 may include a mold frame and a mold base, in addition to any other number of components, such as a tie bar.

In some examples, once the shot of molten plastic material 114 is injected into the mold cavity 122, the reciprocating screw 112 halts forward movement. The molten plastic material 114 takes the form of the mold cavity 122 and cools inside the mold 118 until the plastic material 114 solidifies. Upon solidifying, the press 124 releases the first and second mold sides 115, 117, which are then separated from one another. The finished part may then be ejected from the mold 118. The mold 118 may include any number of mold cavities 122 to increase overall production rates. The shapes and/or designs of the cavities may be identical, similar to, and/or different from each other. For instance, a family mold may include cavities of related component parts intended to mate or otherwise operate with one another. In some forms, an "injection cycle" is defined as of the steps and functions performed between commencement of injection and ejection. Upon completion of the injection cycle, a recovery profile is commenced during which the reciprocating screw 112 returns to the first position **112*a***.

The injection molding machine 100 also includes a controller 140 communicatively coupled with the machine 100 via connection 145. The connection 145 may be any type of wired and/or wireless communications protocol adapted to transmit and/or receive electronic signals. In these examples, the controller 140 is in signal communication with at least one sensor, such as, for example, sensors 128, 130 disposed within or otherwise coupled with the machine 100 and the controller 140. In some examples, a first sensor 128 is located at or near the proximal end 113 of the nozzle 112, and the second sensor 130 is located in, at, or near the nozzle 116 at a location near the mold cavity 122. It is understood that any number of additional real and/or virtual sensors capable of sensing any number of characteristics of the mold 118 and/or the machine 100 may be used and placed at desired locations of the machine 100.

The controller 140 can be disposed in a number of positions with respect to the injection molding machine 100. As examples, the controller 140 can be integral with the machine 100, contained in an enclosure that is mounted on the machine, contained in a separate enclosure that is positioned adjacent or proximate to the machine, or can be positioned remote from the machine. In some embodiments, the controller 140 can partially or fully control functions of the machine via wired and/or wired signal communications as known and/or commonly used in the art.

The sensors 128, 130 may be any type of sensor adapted to measure (either directly or indirectly) one or more characteristics of the molten plastic material 114 and/or portions of the machine 100. The sensors 128, 130 may measure any characteristics of the molten plastic material 114 that are known and used in the art, such as, for example, compressibility, a pressure value, temperature, flow rate, hardness, strain, viscoelasticity, or any one or more of any number of additional characteristics which are indicative of these. The sensors 128, 130 may or may not be in direct contact with the molten plastic material 114. In some examples, the sensors 128, 130 may be in the form of force sensors and/or transducers. In some examples, the sensors 128, 130 may be adapted to measure any number of characteristics of the injection molding machine 100 and not just those characteristics pertaining to the molten plastic material 114. As an example, the sensors 128, 130 may be pressure transducers that measure a melt pressure (during the injection cycle) and/or a back pressure (during the extrusion profile and/or recovery profile) of the molten plastic material 114 at the nozzle 116.

Each of the sensors 128, 130 generates a signal which is transmitted to an input of the controller 140. The controller 140 may receive and translate the measurements to other characteristics of the molten plastic material 114, such as a viscosity value.

As previously noted, in various embodiments, the first sensor 128 may be located at or near the distal end 113 of the screw 112. The second sensor 130 may be located at or near the nozzle 116 or at any location in the flow channel prior to the material reaching the mold cavity 122 without being positioned inside (due to the resulting pressure drop that would result in a measured compressibility as a zero-value). Other suitable locations for placement of the sensors 128, 130 are possible such as, for example, anywhere in front of a check ring of the screw 112.

The controller 140 is also in signal communication with a screw control 126. In some embodiments, the controller 140 generates a signal which is transmitted from an output of the controller 140 to the screw control 126. The controller 140 can control any number of characteristics of the machine, such as injection pressures (by controlling the screw control 126 to advance the screw 112 at a rate which maintains a desired value corresponding to the molten plastic material 114 in the nozzle 116), barrel temperatures, clamp closing and/or opening speeds, cooling time, inject forward time, overall cycle time, pressure set points, ejection time, screw recovery speed, back pressure values exerted on the screw 112, and screw velocity.

The signal or signals from the controller 140 may generally be used to control operation of the molding process such that variations in material density, viscosity, mold temperatures, melt temperatures, and other variations influencing filling rate are taken into account by the controller 140. Alternatively or additionally, the controller 140 may make necessary adjustments in order to control for other material characteristics. Adjustments may be made by the controller 140 in real time or in near-real time (that is, with a minimal delay between sensors 128, 130 sensing values and changes being made to the process), or corrections can be made in subsequent cycles. Furthermore, several signals derived from any number of individual cycles may be used as a basis for making adjustments to the molding process. The controller 140 may be connected to the sensors 128, 130, the screw control 126, and or any other components in the machine 100 via any type of signal communication approach.

The controller 140 includes software 141 adapted to control its operation, any number of hardware elements 142 (such as, for example, a non-transitory memory module and/or processors), any number of inputs 143, any number of outputs 144, and any number of connections 145. The software 141 may be loaded directly onto a non-transitory memory module of the controller 140 in the form of a non-transitory computer readable medium, or may alternatively be located remotely from the controller 140 and be in communication with the controller 140 via any number of controlling approaches. The software 141 includes logic, commands, and/or executable program instructions which may contain logic and/or commands for controlling the injection molding machine 100 according to a mold cycle. The software 141 may or may not include an operating system, an operating environment, an application environment, and/or a user interface.

The hardware 142 uses the inputs 143 to receive signals, data, and information from the injection molding machine being controlled by the controller 140. The hardware 142 uses the outputs 144 to send signals, data, and/or other information to the injection molding machine. The connection 145 represents a pathway through which signals, data, and information can be transmitted between the controller 140 and its injection molding machine 100. In various embodiments this pathway may be a physical connection or a non-physical communication link that works analogous to a physical connection, direct or indirect, configured in any way described herein or known in the art. In various embodiments, the controller 140 can be configured in any additional or alternate way known in the art.

The connection 145 represents a pathway through which signals, data, and information can be transmitted between the controller 140 and the injection molding machine 100. In various embodiments, these pathways may be physical connections or non-physical communication links that work analogously to either direct or indirect physical connections configured in any way described herein or known in the art. In various embodiments, the controller 140 can be configured in any additional or alternate way known in the art.

As previously indicated, the second sensor 130 is positioned downstream from the first sensor 128. Due to the inherent material properties of the molten plastic material 114, the material will exhibit greater compressibility at a location at or near the proximal end 113 of the screw 112 (i.e., where the first sensor 128 is generally positioned) as compared to a location at or near the mold cavity 122 (i.e., where the second sensor 130 is generally positioned). The sensors 128, 130 may measure a variable such as material compressibility (e.g., by way of measuring a force exerted thereon by the molten plastic material 114) at each respective location, which may in turn be used to determine a measured density of the molten plastic material 114 at each location. The controller 140 may receive these sensed values to determine a measured compressibility ratio value which, in some examples, may be a difference and/or an average between the measured variable obtained by the first and second sensors 128, 130.

The measured compressibility ratio value may then be compared with a previously-obtained reference compressibility ratio value. In some examples, during a validation stage, a number of varying injection cycles are performed until a molded part having ideal and/or desirable characteristics is obtained. Measurements obtained from the first and second sensors 128, 130 may be compared with each other during this ideal injection cycle to generate the reference compressibility ratio value. In other examples, the reference compressibility ratio value may be obtained during a previous injection cycle or production run of the machine. More specifically, upon a user identifying a preferred molded part or parts, they may instruct the controller 140 to flag a specific injection cycle in order to use the sensed and measured values in subsequent injection cycles. Other examples are possible.

In some environments, the measured compressibility ratio value may be different than the reference compressibility ratio value. For example, in some examples where PCR is used, the molten polymer material 114 may be non-homogenous and therefore may possess different material characteristics throughout a product run. As a result, in subsequent injection cycles, a density of the molten plastic material 114 may increase or decrease. While existing systems may be capable of determining whether such material characteristics such as viscosity and density have changed, such systems are unable to distinguish between a change in material viscosity and a change in material density, and instead may make the same adjustment or adjustments to the injection cycle regardless of what actual change has occurred.

Based on the relational change and comparison between the measured compressibility ratio value and the reference compressibility ratio value, the controller 140 may adjust at least one control parameter in order to cause subsequently-obtained sensed measurements to equal (or, in some examples, to be within a specified threshold of, e.g., approximately +5% of) the reference compressibility ratio value. While some existing systems capable of adjusting for changes in material viscosity may adjust operational parameters such as injection pressure in an attempt to account for such material changes during the molding cycle, these adjustments are typically performed at different stages in the injection process than where variances in material density may be addressed. More specifically, viscosity-based variances are generally accounted and adjusted for in the range between approximately 10% and 60% completion time of the injection molding cycle (i.e., during the fill stage of the cycle). However, approaches in the present disclosure advantageously measure and determine material density and therefore may cause the controller 140 to adjust operational parameters to compensate for changes to compressibility within the first approximately 10% by time of the shot as well as the last approximately 40% by time of the shot, and as such, may more accurately account for these changes.

In some examples, the operational parameter may be in the form of the drive force on the screw, a target injection pressure, a screw recovery profile, an end of fill response and/or other corrective actions such as sending the molten plastic material 114 to be further processed or blended. Such operational parameters may be made on the fly during each injection cycle by controlling the machine 100 to maintain the relative compressibility ratios between the first and second sensors 128, 130. In some examples, the system may make corrections using Process Factor A and/or other similar techniques. In some examples, the end-of-fill and/or transfer position may also be adjusted. In some examples, any of these and other adjustments may be made on an intra- or inter-shot basis by incorporating dynamic shot processes.

It is appreciated that in some examples, the machine 100 may additionally sense any changes to the viscosity of the molten polymer material 114 and adjust operational parameters in response to these changes in addition to sensing and adjusting parameters in response to changes in the density of the molten polymer material 114. As a non-limiting example, the machine 100 may measure a shear rate (e.g., a speed that the molten polymer material 114 is moving in relation to the amount of applied pressure) of the molten polymer material 114. Such measurements may occur via the use of a screw movement (e.g., velocity) measurement coupled with a sensor positioned at or near the nozzle. Other suitable approaches are possible. This measured shear rate may be compared with a reference shear rate, and any differences between these values may be used to adjust an operational or control parameter to cause a subsequently-measured shear rate to be equal to (or within an allowable threshold value of) the reference shear rate.

Turning to FIG. 2, an approach 200 is provided for controlling a molding machine having a mold forming a mold cavity, a nozzle, and a screw that moves from a first position to a second position toward the nozzle and being controlled according to a mold cycle. First, at a step 202, a molten polymer is injected into the mold cavity. At a step 204, a first measurement of a variable during the injection cycle is obtained using a first sensor positioned at or near the screw. At a step 206, a second measurement of the variable is obtained during the injection cycle. As previously described, the second sensor is positioned at or near the nozzle. At a step 208, a measured compressibility ratio value is determined in the form of a difference between the measured variable obtained by the first sensor and the measured variable obtained by the second sensor. At a step 210, the measured compressibility ratio value is compared with a reference compressibility ratio value. At a step 210 at least one operational or control parameter is adjusted based on the difference between the reference compressibility ratio value and the measured compressibility ratio value.

Figure 3:
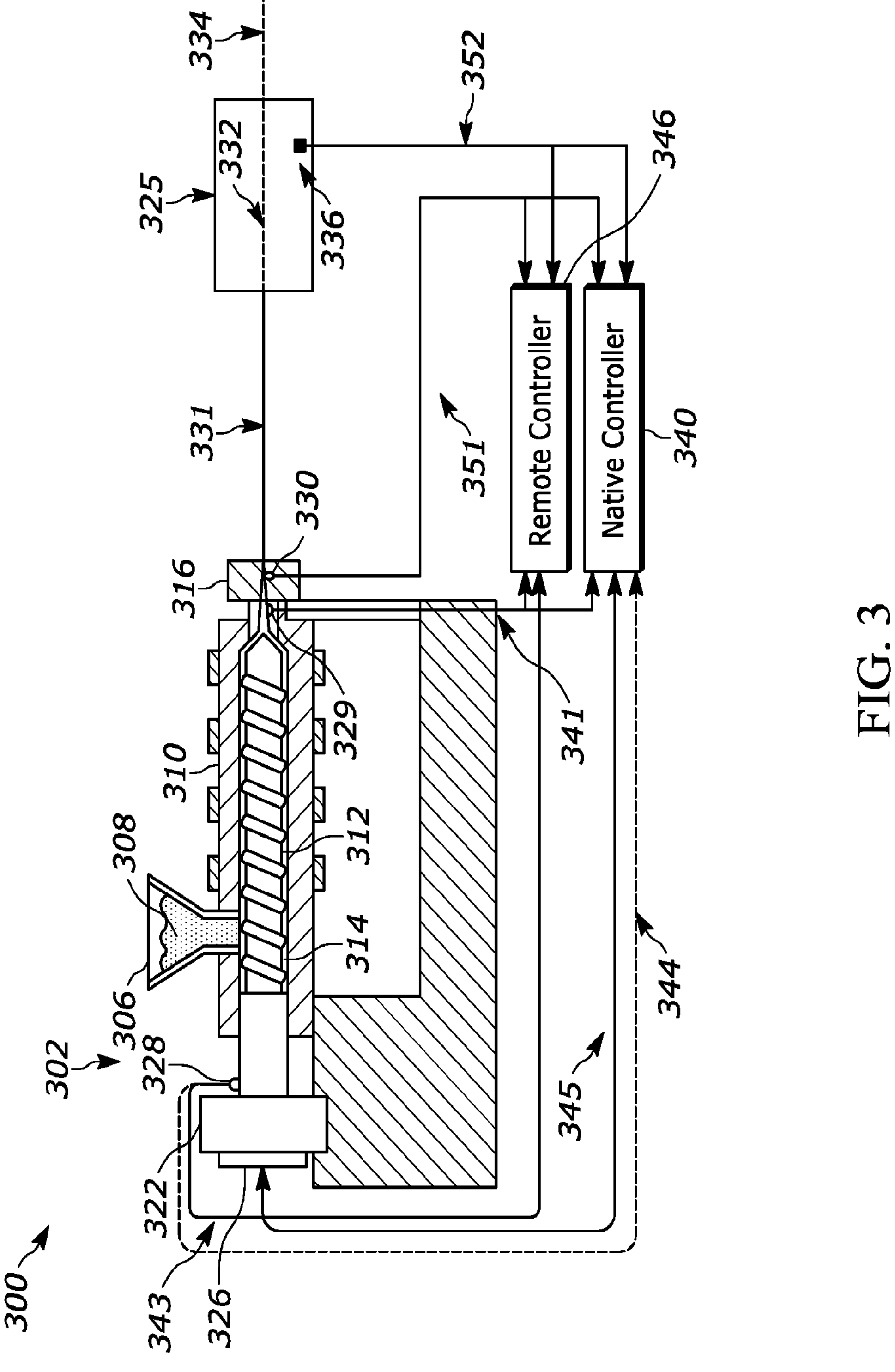
FIG. 3 illustrates a schematic view of an example extrusion molding apparatus having a controller coupled therewith in accordance with various embodiments of the present disclosure.
Figure 4:
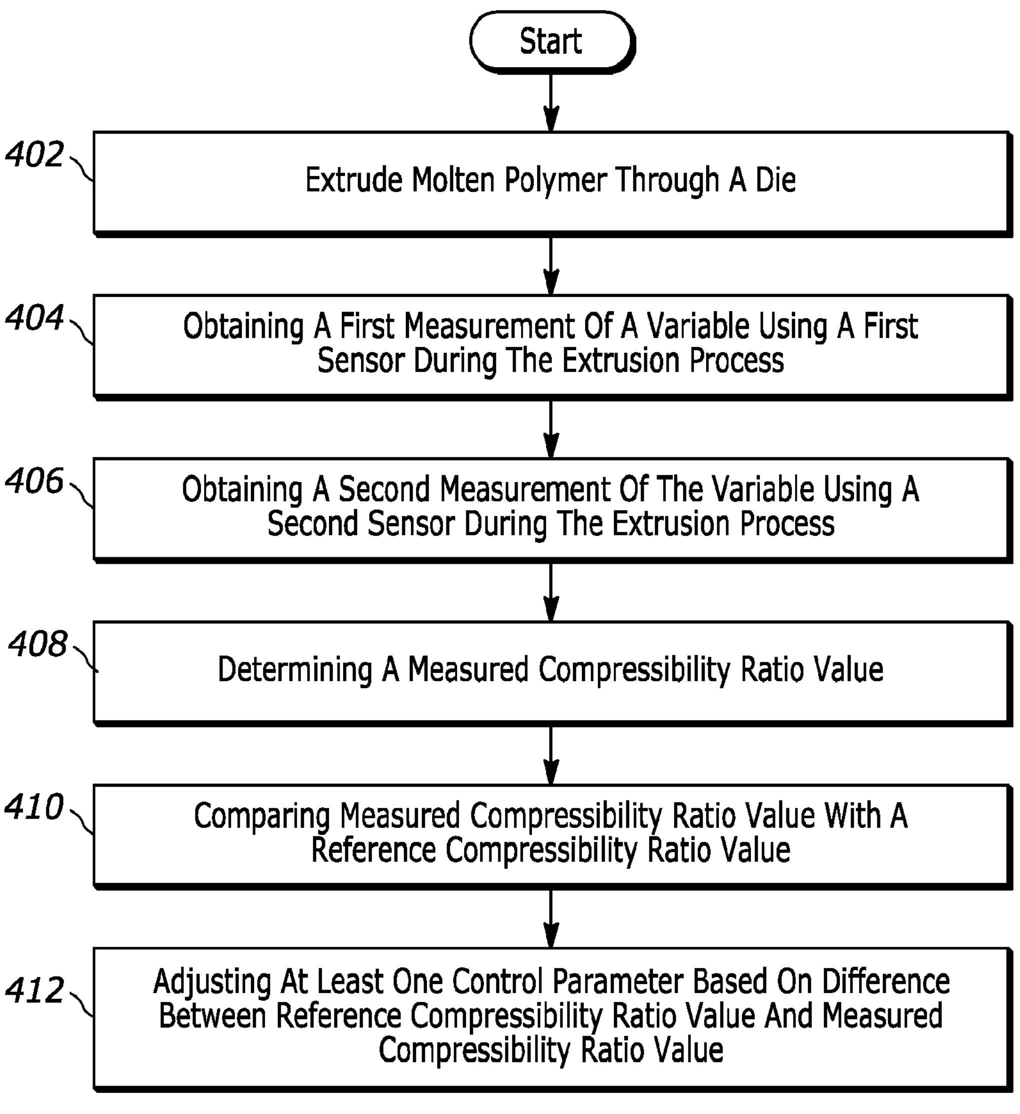
FIG. 4 illustrates an example flow diagram of an example molding cycle having density-based control approaches in accordance with various embodiments of the present disclosure.

Further, it will be appreciated that the systems and approaches described herein may be applied to an extrusion molding apparatus. Generally, in such an apparatus, a mold cavity is not provided and rather, extrusion molding components may be incorporated into the system. With reference to FIGS. 3 & 4, the extrusion molding machine 300 includes an extrusion unit 302. The extrusion unit 302 includes a hopper 306 adapted to accept material in the form of pellets 308 or any other suitable form. In many of these examples, the pellets 308 may be a polymer or polymer-based material such as, for example, post-consumer regrind (PCR). Other examples are possible. The extrusion unit 302 further includes a heated barrel 310, a rotating screw 312, and a die 316.

As with the example described in FIGS. 1 & 2, the hopper 306 feeds the pellets 308 into a heated barrel 310 of the extrusion unit 302. Upon being fed into the heated barrel 310, the pellets 308 may be driven to the end of the heated barrel 310 towards a barrel end cap **310*a* by the rotating screw 312. The rotating screw 312 remains stationary with respect to the heated barrel 310. The heating of the heated barrel 310 and the compression of the pellets 308 by the reciprocating screw 312 causes the pellets 308 to melt, thereby forming a molten plastic material or polymer 314. The molten plastic material 314** is typically processed at a temperature selected within a range of about 130° C. to about 410° C. (with manufacturers of particular polymers typically providing extruders with recommended temperature ranges for given materials).

The rotating screw 312 forces the molten plastic material 314 toward a die 316 to form an extrudate plastic material that will ultimately be the molded part.

An actuation unit 322 is provided that is operably coupled with the rotating screw 312 to facilitate powered rotation thereof. In some examples, the actuation unit 322 may be in the form of a hydraulic motor. In other examples, the actuation unit 322 may be in the form of an electric motor. In these and other examples, the actuation unit 322 may additionally or alternatively include a valve, a flow controller, an amplifier, or any of a variety of other suitable control devices for extrusion molding apparatuses or non-extrusion molding apparatuses.

The die 316 may be associated with post mold handling equipment 325. A final product 334 results after the molten plastic material 314 is extruded to form extrudate 331 and undergoes any desired post mold handling equipment 325. The extrudate 331 may take an intermediate form 332 during the post mold handling equipment 325 operation. Molten thermoplastic material 314 cools significantly as it flows through the die 316, however the post mold handling equipment 325 may supply additional cooling. In some embodiments, the post mold handling equipment 325 may include a plurality of options to generate various molded parts (e.g., tube, rod, film, blown film, bags, pellets, bottles, etc.). The post mold handling equipment 325 may also include electronic components capable of generating an output signal 336 that communicates via signal line 352 a condition and/or characteristic of the extrudate 331 such as, for example, thickness, temperature, line speed, etc. to control systems (e.g., a remote controller 46 and/or a native controller 40).

As previously noted, the extrusion molding machine 300 also includes a native controller 340 communicatively coupled with the extrusion molding machine 300 via connection 345. The connection 345 may be any type of wired and/or wireless communications protocol adapted to transmit and/or receive electronic signals. In these examples, the native controller 340 is in signal communication with a screw control 326 via connection 345. The native controller 340 may command the screw control 326 to turn the rotating screw 312 at a rate that maintains a desired molding process such that variations in material viscosity, die temperatures, melt temperatures, and other variations that may influence extrusion rate are taken into account by the native controller 340. Such adjustments may be made in real time by the native controller 340. In one embodiment, when the actuation unit 322 is a hydraulic motor, the screw control 326 can include a hydraulic valve associated with the rotating screw 312. In another embodiment, when the actuation unit 322 is an electric motor, the screw control 326 can include an electric controller associated with the rotating screw 312. In the embodiment of FIG. 3, the native controller 340 can, for example, generate a signal that is transmitted from an output of the native controller 340 to the screw control 326 to control a rate of rotation of the rotating screw 312.

The native controller 340 can be an on-board controller that is original to the extrusion molding unit 302 and built along with the extrusion molding unit 302. The native controller 340 can be disposed in a number of positions with respect to the extrusion molding machine 300. As examples, the controller 340 can be integral with the extrusion molding machine 300, contained in an enclosure that is mounted on the machine, contained in a separate enclosure that is positioned adjacent or proximate to the machine, or can be positioned remote from the machine. In some embodiments, the native controller 340 can partially or fully control functions of the machine via wired and/or wired signal communications as known and/or commonly used in the art. As such, in some examples, modifications to the control architecture of the native controller 340 or removal of the native controller 340 may be time consuming, expensive and in some instances impossible.

The native controller 340 can be any of a variety of suitable controllers for controlling the molding process. In some arrangements, the native controller 340 may be a PID controller natively configured to implement a PID control algorithm. In addition to the native controller 340 controlling the screw rotation of the actuation unit 322 using a melt pressure sensor 329, the control variable may, for example, be a temperature or a pressure associated with the molten thermoplastic material 314 at a particular location in the extrusion molding unit 302. A controlled molten thermoplastic pressure may correspond, for example, to (1) an extrusion pressure detected via an extrusion pressure sensor 328 located at or near the actuation unit 322, (2) a melt pressure detected via a melt pressure sensor 329 located at or near the die 316, or (3) a pressure detected via a die pressure sensor 330 located proximate to an end of the die 316. The native controller 340 may generally be configured to provide a control signal to control an operation of the extrusion molding unit 302 (e.g., a signal to the screw control 326 to control the rotating screw 312 based upon the sensed control variable being provided as an input to the control algorithm of the native controller 340 (e.g., based upon comparison of the sensed control variable and a setpoint defined by the native controller 340).

The extrusion pressure sensor 328 can facilitate detection (direct or indirect) of the extrusion pressure inside of the heated barrel 310 (i.e., the pressure of the heated barrel 310 at the beginning of the rotating screw 312) by providing a feedback signal via a signal line 344 to the native controller 340. The native controller 340, in some embodiments, can detect the extrusion pressure from the feedback signal and can control (e.g., feedback control) the pressures within the extrusion molding machine 300 by controlling the screw control 326, which controls the rates of extrusion by the extrusion molding unit 302.

The melt pressure sensor 329 can facilitate detection (direct or indirect) of the actual melt pressure (e.g., the measured melt pressure) of the molten thermoplastic material 314 at or near the die 316. The melt pressure sensor 329 may or may not be in direct contact with the molten thermoplastic material 314. In some embodiments, the melt pressure sensor 329 can be a pressure transducer that transmits an electrical signal via a signal line 341 to an input of the native controller 340 in response to the melt pressure at the die 316. In some embodiments, the melt pressure sensor 329 can facilitate monitoring of any of a variety of additional or alternative characteristics of the molten thermoplastic material 314 at the die 316 that might indicate melt pressure, such as temperature, viscosity, and/or flow rate, for example. If the melt pressure sensor 329 is not located within the die 316, the native controller 340 can be set, configured, and/or programmed with logic, commands, and/or executable program instructions to provide appropriate correction factors to estimate or calculate values for the measured characteristic in, at, or near the die 316. It is to be appreciated that sensors other than a melt pressure sensor can be employed to measure any other characteristics of the molten thermoplastic material 314, the screw 312, the barrel 310, or the like that is known in the art, such as, temperature, viscosity, flow rate, strain, velocity, etc. or one or more of any other characteristics that are indicative of any of these.

The die pressure sensor 330 may facilitate detection (direct or indirect) of the melt pressure of the molten thermoplastic material 314 in, at, or near the die 316. The die pressure sensor 330 may or may not be in direct contact with the molten thermoplastic material 314. In some examples, the die pressure sensor 330 can be a pressure transducer that transmits an electrical signal via a signal line 351 to an input of the native controller 340 or to an input of the remote controller 346 in response to the die pressure within the die 316. In other embodiments, the die pressure sensor 330 can facilitate monitoring of any of a variety of additional or alternative characteristics of the thermoplastic material 314.

Still referring to FIG. 3, a remote controller 346 (e.g., a PID controller) can be in signal communication with the native controller 340, the extrusion pressure sensor 328, the melt pressure sensor 329, and/or the die pressure sensor 330. Prior to retrofitting the remote controller 346 to the extrusion molding machine 300, the native controller 340 can be in signal communication with any one or more of the extrusion pressure sensor 328, melt pressure sensor 329, and die pressure sensor 330 in the manner described above. To retrofit (e.g., associate) the remote controller 346 to the extrusion molding machine 300, output from one or more of the extrusion pressure sensor 328, melt pressure sensor 329, and/or the die pressure sensor 330 may be connected to the remote controller 346 (and optionally, disconnected from the native controller 340), thereby diverting sensor output from the sensor(s) to the remote controller 346 in lieu of the native controller 340. Once the retrofit is complete, the native controller 340 may no longer directly receive feedback signals from the one or more sensors disconnected from the native controller 340. Instead, the remote controller 346 receives these feedback signals, and generates and transmits a modified feedback signal to the native controller 340 that enhances the operation of the native controller 340 by affecting the manner in which the native controller 340 controls the operation of the extrusion molding machine 300. The native controller 340 and the remote controller 346 thus operate in a closed-loop type control arrangement that mimics the arrangement that existed prior to addition of the remote controller 346.

In some embodiments as described above, the extrusion pressure sensor 328, melt pressure sensor 329, and die pressure sensor 330 already exist on the extrusion molding unit 302 prior to the retrofitting and are in signal communication with the native controller 340. In such embodiments, retrofitting of the remote controller 346 to the extrusion molding apparatus 300 involves disconnecting the sensors from the native controller 340 and reconnecting the sensors to the remote controller 346. Alternatively, in some arrangements, one or more of the extrusion pressure sensor 328, the melt pressure sensor 329, and the die pressure sensor 330 may not already exist in the extrusion molding unit 302 prior to the retrofitting. In these examples, retrofitting of the remote controller 346 to the extrusion molding machine 300 may include installing one or more sensors to the extrusion molding unit 302 and connecting the installed sensor(s) to the remote controller 346.

In some embodiments, retrofitting the remote controller 346 to the extrusion molding machine 300 may include diverting (or installing and connecting) still other sensor output to the remote controller 346 instead of the native controller 340 in a manner analogous to that described above, wherein the still other sensor(s) are configured to measure a control variable to which a control strategy of the native controller 340 and/or remote controller 346 pertains (e.g., a temperature sensor, flow sensor, etc.).

Further still, the process of retrofitting the remote controller 346 to the extrusion molding apparatus 300 may include connecting an output of the setpoint of the native controller 340 to the remote controller 346. That is, whereas the native controller 340 prior to the retrofitting may provide the native controller setpoint to the control algorithm of the native controller 340, the native controller 340 after the retrofitting may additionally provide its setpoint via a signal communication to the remote controller 346. It should be understood that, in light of the fact that the setpoint defined by the native controller may change over the course of the extrusion molding cycle (e.g., as a product of ramping or stepping-up of the control variable setpoint during control iterations), the providing of the native controller setpoint to the remote controller 346 may include providing the setpoint each time the native controller 340 defines the control variable setpoint (e.g., at each iteration of the control loop). Thus, the remote controller 346 maintains awareness of the current value of the native controller setpoint, so as to correctly provide a modified feedback signal to be provided to the native controller 340, as described herein.

The native controller 340 includes software (not illustrated) adapted to control its operation, any number of hardware elements (not illustrated; such as, for example, a non-transitory memory module and/or processors), any number of inputs, any number of outputs, and any number of connections. The software may be loaded directly onto a non-transitory memory module of the native controller 340 in the form of a non-transitory computer readable medium, or may alternatively be located in the remote controller 346 and be in communication with the native controller 340 via any number of controlling approaches. The software includes logic, commands, and/or executable program instructions which may contain logic and/or commands for controlling the extrusion molding machine 300 according to a mold cycle. The software may or may not include an operating system, an operating environment, an application environment, and/or a user interface.

The hardware uses the inputs to receive signals, data, and information from the extrusion molding machine 300 being controlled by the native controller 340. The hardware uses the outputs to send signals, data, and/or other information to the extrusion molding machine 300. In various embodiments the pathway between the native controller 340 and the extrusion molding machine 300 may be a physical connection or a non-physical communication link that works analogous to a physical connection, direct or indirect, configured in any way described herein or known in the art. In various embodiments, the native controller 340 can be configured in any additional or alternate way known in the art.

As previously indicated, the second sensors 329, 330 are positioned downstream from the first sensor 328. Due to the inherent material properties of the molten plastic material 314, the material will exhibit lower compressibility at a location at or near the end of the rotating screw 312 closest to the screw control 326 (i.e., where the first sensor 328 is generally positioned) as compared to a location at or near the die 316 (i.e., where the second and third sensors 329, 330 are generally positioned). The sensors 328, 329, 330 may measure a variable such as material compressibility (e.g., by way of measuring a force exerted thereon by the molten plastic material 314) at each respective location, which may in turn be used to determine a measured density of the molten plastic material 314 at each location. The native controller 340 may receive these sensed values to determine a measured compressibility ratio value which, in some examples, may be a difference and/or an average between the measured variable obtained by the sensors 328, 329, 330.

The measured compressibility ratio value may then be compared with a previously obtained reference compressibility ratio value. In some examples, during a validation stage, a number of varying extrusion sample runs are performed until a molded part having ideal and/or desirable characteristics is obtained. Measurements obtained from the sensors 328, 329, 330 may be compared with each other during this ideal extrusion run to generate the reference compressibility ratio value. In other examples, the reference compressibility ratio value may be obtained during a previous extrusion run or production run of the machine. More specifically, upon a user identifying a preferred molded part or parts, they may instruct the controller 340 to flag a specific extrusion run in order to use the sensed and measured values in subsequent extrusion runs. Other examples are possible.

In some environments, the measured compressibility ratio value may be different than the reference compressibility ratio value. For example, in some examples where PCR is used, the molten polymer material 314 may be non-homogenous and therefore may possess different material characteristics throughout a product run. As a result, a density of the molten plastic material 314 may increase or decrease throughout the run. While existing systems may be capable of determining whether such material characteristics such as viscosity and density have changed, such systems are unable to distinguish between a change in material viscosity and a change in material density, and instead may make the same adjustment or adjustments to the extrusion process regardless of what actual change has occurred.

Based on the relational change and comparison between the measured compressibility ratio value and the reference compressibility ratio value, the native controller 340 may adjust at least one control parameter in order to cause subsequently-obtained sensed measurements to equal (or, in some examples, to be within a specified threshold of, e.g., approximately ±5% of) the reference compressibility ratio value.

In some examples, the operational parameter may be in the form of the drive force on the screw, a target extrusion pressure and/or other corrective actions such as sending the molten plastic material 314 to be further processed or blended. Such operational parameters may be made on the fly during the extrusion run by controlling the machine 300 to maintain the relative compressibility ratios between the first and second sensors 328, 329, 330.

It is appreciated that in some examples, the extrusion molding machine 300 may additionally sense any changes to the viscosity of the molten polymer material 314 and adjust operational parameters in response to these changes in addition to sensing and adjusting parameters in response to changes in the density of the molten polymer material 314. As a non-limiting example, the machine 300 may measure a shear rate (e.g., a speed that the molten polymer material 314 is moving in relation to the amount of applied pressure) of the molten polymer material 314. Such measurements may occur via the use of a screw movement (e.g., rotation velocity) measurement coupled with a sensor positioned at or near the die. Other suitable approaches are possible. This measured shear rate may be compared with a reference shear rate, and any differences between these values may be used to adjust an operational or control parameter to cause a subsequently measured shear rate to be equal to (or within an allowable threshold value of) the reference shear rate.

Turning to FIG. 4, an approach 400 is provided for controlling a molding machine having a die forming a profile and a screw that rotates at a variable rate and is controlled according to a continuous extrusion molding process. First, at a step 402, a molten polymer is extruded through the die. At a step 404, a first measurement of a variable during extrusion is obtained using a first sensor positioned at or near the screw. At a step 406, a second measurement of the variable is obtained during extrusion. As previously described, the second sensor is positioned at or near the die. At a step 408, a measured compressibility ratio value is determined in the form of a difference between the measured variable obtained by the first sensor and the measured variable obtained by the second sensor. At a step 410, the measured compressibility ratio value is compared with a reference compressibility ratio value. At a step 410 at least one operational or control parameter is adjusted based on the difference between the reference compressibility ratio value and the measured compressibility ratio value.

It is also appreciated that the molding machines and approaches 100, 200, 300 and/or the approach 400 described herein may measure the compressibility and/or density using any number of alternative suitable approaches. For example, in some arrangements, a flowmeter (not illustrated) may be disposed in the feed throat of the machine. Further, while the use of two or three sensors may advantageously provide for redundancy, in some arrangements, an existing melt pressure transducer may be used in conjunction with an additional sensor to approximate changes in material density. Similarly, in some examples, a load cell or hydraulic press may be used in conjunction with an additional sensor to measure density. However, in other examples, the use of two or three separate sensors may advantageously result in the elimination of the load cell, therefor reducing equipment costs. In yet other arrangements, plunger advancing systems may be incorporated into the molding machines as a replacement for screws to urge the molten polymer material into the mold cavity. Compared with conventional systems that use upstream sensors, the present system may readily incorporate sensors downstream while still being capable of making adjustments for density changes to the material.

Further, in some arrangements, changes in material density may be used to determine scaling values for corrections. For example, instead of using a system that first determines initial setpoints to start the manufacture of suitable parts, the present system may be used to determine what initial parameters should be to uses as a correction factor to correct for detected variation in density.

So arranged, the present molding machines 100, 300 can make informed decisions on process adjustments while accurately identifying the nature of changes in material characteristics of the molten polymer material by distinguishing between density and viscosity changes, and may eliminate unnecessary process adjustments. For example, while melt density and viscosity are independent characteristics of the molten polymer material, they can be affected by the same changes to the extrusion process. Accordingly, adjustments for viscosity (e.g., pressure and other adjustments made during the molding process) may inadvertently affect melt density during the cycle or process. These adjustments may be eliminated in the present system and approaches because the system would instead make a separately calculated pressure adjustment (e.g., at the end of fill stage of the injection cycle). This determination may result in parts that achieve the same stress distribution, shrinkage rates, and/or dimensional specifications as other processes capable of adjusting for variances in viscosity while additionally maintaining consistent part quality across product runs.

Such as system may allow an operator and/or the machine to calculate the true density (and/or viscosity) changes to the molten plastic in real time, and may use this information in a feedback loop to appropriately adjust the system. Further, material data may be stored in real time for the purpose of sending material quality data points to processing facilities to assist with maintaining appropriate PCR regrind quality. Historical data may also be collected and stored for process quality control.

By incorporating the approaches described herein, the molding machines 100, 300 may safely operate in an efficient manner while ensuring parts are produced having minimal defects and/or flaws by making adjustments to ensure the density and/or viscosity of the material remains constant. The processes described herein may advantageously be incorporated into conventional injection molding systems, injection molding systems incorporating low, substantially constant pressure approaches, injection molding systems incorporating specialized control based on real-time density measurements, extrusion molding systems, and any other systems.

Additionally, in some environments, the real-time density measurements described herein may result in time savings while consistently producing high-quality parts. The processes described herein may advantageously be incorporated into various extrusion molding systems for manufacturing tube, rod, film, blown film, bags, pellets, bottles, etc.

Further, it will be appreciated that the systems and approaches described herein may be applied in the formation of any number of different molded parts constructed from a variety of materials such as, for example silicone and metal parts.

The above-described approaches may be used in conjunction with any injection process where the previously-identified pattern is used to drive at least a portion of the injection cycle. These approaches may be used in the formation of any number of different molded parts constructed from a variety of materials such as, for example silicone and metal parts.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A method for controlling a molding machine having a mold forming a mold cavity, a nozzle, and a screw that moves from a first position to a second position toward the nozzle, the molding machine being controlled by a controller according to a mold cycle, the method comprising:
- injecting a molten polymer into the mold cavity;
- obtaining, using a first sensor positioned at or near the screw, a first measurement of a variable during the mold cycle, the variable comprising a compressibility of the molten polymer;
- obtaining, using a second sensor positioned at or near the nozzle, a second measurement of the variable during the mold cycle;
- determining a measured compressibility ratio value, the measured compressibility ratio value being a difference between the measured variable obtained by the first sensor and the measured variable obtained by the second sensor;
- comparing the measured compressibility ratio value with a reference compressibility ratio value;
- adjusting at least one control parameter based on a difference between the reference compressibility ratio value and the measured compressibility ratio value; and
- the compressibility of the molten polymer is used to determine a density value thereof, wherein the adjusting of the at least one control parameter occurs within 10% a mold cycle time and 40% of the mold cycle time.

2. The method of claim 1, wherein the first sensor is positioned behind a proximal end of the screw.

3. The method of claim 2, wherein the first sensor comprises a force sensor.

4. The method of claim 1, wherein the second sensor is positioned within a flow channel of the molding machine upstream of the mold cavity.

5. The method of claim 1, wherein the step of adjusting the at least one control parameter comprises adjusting a target injection pressure value.

6. The method of claim 1, further comprising the steps of:
- measuring a shear rate of the molten plastic polymer to determine a change in viscosity value of the molten polymer; and
- adjusting at least one control parameter based on a difference between the measured shear rate and a reference shear rate.

7. The method of claim 1, wherein the reference compressibility ratio value is obtained by measuring the reference compressibility ratio value during a previous injection cycle.

8. The method of claim 7, wherein the previous injection cycle comprises a validation cycle or a projection cycle.

9. A method for controlling a molding machine having a die forming a profile and a screw that is rotatable at a variable rate, the molding machine being controlled by a controller according to at least one molding parameter, the method comprising:
- extruding a molten polymer through the die;
- obtaining, using a first sensor positioned at or near the screw, a first measurement of a variable;
- obtaining, using a second sensor positioned at or near the die, a second measurement of the variable;
- determining a measured compressibility ratio value, the measured compressibility ratio value being a difference between the measured variable obtained by the first sensor and the measured variable obtained by the second sensor;
- comparing the measured compressibility ratio value with a reference compressibility ratio value; and
- adjusting at least one control parameter based on a difference between the reference compressibility ratio value and the measured compressibility ratio value, wherein the adjusting of the at least one control parameter occurs within 10% a mold cycle time and 40% of the mold cycle time.

10. The method of claim 9, wherein the measured variable comprises a compressibility of the molten polymer.

11. The method of claim 9, wherein the compressibility of the molten polymer is used to determine a density value thereof.

12. The method of claim 9, wherein the first sensor is positioned behind a proximal end of the screw.

13. The method of claim 12, wherein the first sensor comprises a force sensor.

14. The method of claim 9, wherein the second sensor is positioned within a flow channel of the molding machine upstream of the die.

15. The method of claim 9, wherein the second sensor is positioned outside of a flow channel of the molding machine.

16. The method of claim 9, wherein a third sensor is positioned within a flow channel of the molding machine upstream of the die.

17. The method of claim 9, wherein a third sensor is positioned outside of a flow channel of the molding machine.

18. The method of claim 9, wherein the step of adjusting the at least one control parameter comprises a target molding pressure value.

19. The method of claim 9, further comprising the steps of:

measuring a shear rate of the molten polymer to determine a change in viscosity value of the molten polymer; and adjusting at least one control parameter based on a difference between the measured shear rate and a reference shear rate.

20. The method of claim 9, wherein the reference compressibility ratio value is obtained by measuring the reference compressibility ratio value during a previous period of operation.

* * * * *